United States Patent Office — 3,395,117 — Patented July 30, 1968

3,395,117
ORGANOPOLYSILOXANE COMPOSITIONS AND PROCESSES FOR THE PREPARATION OF THE SAME

Alfred J. Burzynski and Robert E. Martin, Toledo, Ohio, assignors to Owens-Illinois, Inc., a corporation of Ohio
No Drawing. Filed Apr. 27, 1966, Ser. No. 545,579
10 Claims. (Cl. 260—46.5)

ABSTRACT OF THE DISCLOSURE

An organopolysiloxane resin is prepared under particular conditions from an ethyltrialkoxysilane represented by the formula

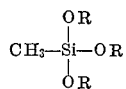

wherein the alkoxy radical contains less than 4 carbon atoms. Ethyltriethoxysilane is preferred. Optionally there may be included in the reaction mass from 0 to about 5.0 mole percent, based on total silane reactant material, of at least one compound different from the above-described ethyltrialkoxysilane and which is represented by the formula

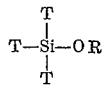

wherein R in the alkoxy radical —OR is an alkoxy radical and each T independently represents an aryl, alkyl or alkenyl radical, each of which contains less than 7 carbon atoms, or the aforementioned alkoxy radical. The reaction mixture contains at least the stoichiometrical amount of water required for complete hydrolysis and condensation of the siloxane precursor, e.g., from about 1.5 to 10 moles $H_2O$ per mole of the silane monomer. An acidity limitation on the initial reaction mixture also is described.

Particular conditions are set forth for (a) heating the reaction mixture to form the initial liquid "siloxane partial condensation product"; (b) for concentrating this product; (c) for precuring the concentrated liquid product; and (d) for cooling the precured partial condensation product to obtain a solid organopolysiloxane resin.

Products of the invention include organic solvent-soluble, siloxane partial condensation products useful, for example, as components of coating compositions or as molding compositions that can be molded to provide thermoset molded articles. The solid partial condensation products also can be mixed with suitable solvents and cast to yield shaped, solid, relatively thick, machinable, heat-resistant, thermoset, organopolysiloxane bodies or structures.

Reference to related applications

This application was copending with our application Ser. No. 384,766 filed July 23, 1964 which is now U.S. Patent No. 3,354,095.

This invention relates to solid heat-softenable, solvent-soluble (potentially thermosetting) organopolysiloxane resins and processes for the preparation of the same. Organopolysiloxane compositions are commercially important. For example, these compositions are useful as coating materials and they can be doped to produce radiation-absorbing media. The prior art discloses a plurality of organopolysiloxane resins; however, the vast majority of these prior art resins are not convertible from a heat-softenable solvent-soluble resin to thermosetting resins without destroying various desirable properties. By the process of the subject invention, a heat-softenable, solvent-soluble organopolysiloxane having excellent forming characteristics can be easily produced.

The thermosetting organopolysiloxane compositions of the prior art are often disadvantageous in that in order to be formed, they must be poured into molds and then heated to effect curing until a hard insoluble resin is produced. This casting technique is time-consuming, often impractical, and results in a product that cannot be dissolved in usual solvents. Likewise, as a forming technique, casting is more expensive when compared with forming techniques suited to heat-softenable, solvent-soluble materials such as compression molding and extruding.

In contrast with the prior art, by the processes of the subject invention, a heat-softenable, solvent-soluble organopolysiloxane resin is produced which can be readily compression molded or extruded into any desired shape. Likewise, the compositions of the present invention when formed are soluble in a variety of solvents.

Accordingly, the primary object of this invention is to provide heat-softenable, solvent-soluble organopolysiloxane resin which has improved solvent solubility.

Likewise, it is an object of this invention to produce a solid heat-softenable, solvent-soluble organopolysiloxane resin which can be extruded or otherwise formed by the forming techniques which are suited to heat-softenable, solvent-soluble resins.

Finally, the objects of this invention include all the other novel features which will be obvious from the specification and claims at hand.

Heat-softenable, solvent-soluble organopolysiloxane resins of the subject invention are produced by the hydrolysis and condensation of at least one compound embraced by Formula I I 

wherein

T independently generally represents a member such as alkyl, cycloalkyl, alkenyl and aryl. More specifically, T is independently a member such as alkyl, e.g., methyl, ethyl and propyl through hexyl (both normal and isomeric forms), cyclopentyl cyclohexyl, vinyl, and the normal and isomeric forms of propenyl through hexenyl and phenyl, Z independently represents an alkoxy group (e.g., methoxy through heptoxy), and n is 1.

In Formula I, as given above for substituent Z, alkoxy groups are required because their hydrolysis products are less acidic, and therefore the silane conjoint hydrolysis and condensation can be controlled to make the solid heat-softenable siloxane partial condensation products. Alkoxy groups of less than 5 carbon atoms are especially advantageous, because the rate of hydrolysis can be inconveniently slow when the organic hydrolyzable radical(s) have a higher molecular weight (i.e., more carbon atoms).

The terms "hydrolysis" product and "condensation" product as used in the preceding paragraph and elsewhere in this specification, and in the appended claims, are intended to include within their meaning the co-hydrolysis and co-condensation products that result when mixtures of silicon-containing starting reactants are employed.

Specific examples of compounds as represented by Formula I which are adapted for use in this invention are methyltrialkoxysilanes such as methyltrimethoxysilane, methyltriethoxysilane, ethyltriethoxysilane, methyltri(1-propoxy)silane, methyltri(2-propoxy)silane, methyltri(2-methyl-2-propoxy)silane, methyltri(1-butoxy)silane, and methyltri(2-butoxy)silane; examples of phenyltrialkoxysilanes are phenyltrimethoxysilane, phenyltriethoxysilane, phenyltri(1-propoxy)silane, phenyltri(2-propoxy)silane, phenyltri(2-methyl-2-propoxy)silane, phenyltri(1-butoxy)silane, and phenyltri(2-butoxy)silane.

A preferred organosilane monomer adapted for use in this invention consists essentially of a compound represented by Formula II II 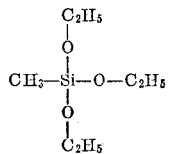

The concentration of water in the initial hydrolysis-condensation reaction mixture of the compound as represented by Formula II above should be in the range of from about 1.5 moles to about 10 moles of water per mole of silane reactant. Preferably the water:total silane molar ratio is from 1.5 to 5.0 moles, still more preferably from 1.5 to 3.0 moles, of water per mole of total silane. Assuming methyltrialkoxysilane as the only monomer, its complete hydrolysis and condensation can be represented as

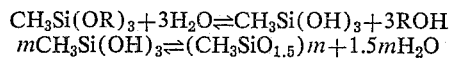
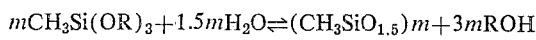

or overall $$mCH_3Si(OR)_3 + 1.5mH_2O \rightleftharpoons (CH_3SiO_{1.5})m + 3mROH$$

where $m$ is a number corresponding to the degree of polymerization and is greater than 1. Thus the lower theoretical limit of water is 1.5 moles per mole of silane. Solid heat-softenable organopolysiloxane resins of this invention can be prepared at this concentration, but further decrease in water content of the reaction mixture leads to polymers which are rubbery and soft, presumably due to incomplete hydrolysis and condensation. If the quantity of water is in the range of about 1.5 moles to 5.0 moles of water per mole of silane monomer, the alkanol by-product formed during hydrolysis acts as a solvent for the other products and reactants, and the initially heterogeneous reaction mixture becomes clear and homogeneous. This homogeneity is desirable, since it prevents resin precipitation and allows more uniform control of resin formation. If the water:silane ratio substantially exceeds 5:1, the alkanol formed is insufficient to convert the aqueous medium to a solvent for the reactants and products; therefore, resin precipitation can occur. Insolubility of resinous products at higher water concentrations can be overcome by adding a water-miscible organic solvent such as ethanol, etc. However, at water concentrations above about 10 moles of water per mole of silane monomer, gel formation can occur even if sufficient organic solvent is added to make the reaction mixture homogeneous. The exact upper limit of the water:silane ratio will depend on such factors as silanes used, acid content, time and temperature, etc. Thus it cannot be set forth precisely, but can be determined by routine test in each case.

Some alkanol by-product must be retained in the reaction mixture during initial hydrolysis and condensation. It is believed that the alkanol formed in the manner indicated by the equations above slows the overall rate of hydrolysis-condensation. This control of the rate of resin formation prevents gel formation and allows preparation of homogeneously highly cross-linked polymers with good dimensional stability. If the by-product alkanol concentration is allowed to fall substantially below 1.5 moles of alkanol per mole of silane monomer (assuming complete hydrolysis according to the above equations), gel formation occurs. This limit can vary slightly with particular conditions and materials used.

To avoid gelation and effect hydrolysis and polysiloxane formation of the compound represented by Formula II at a conveniently rapid rate, the acidity of the initial hydrolysis-condensation reaction mixture must be maintained within certain limits hereinafter set forth in detail.

A means of purifying the starting silane monomer II as described above and monomers III and IV as will be described herein below, to insure the right acidity, is distillation from admixture of the monomers with a reagent which will convert acidic species present to nonvolatile compounds. Thus distillation of the monomers from admixture with alkali-metal alkoxides such as sodium ethoxide or methoxide or aqueous dilute alkali or aqueous alkali-metal carbonate is usually suitable. The methods involving aqueous media are of less advantage when the monomer contains silicon-bonded methoxyl groups, because these species hydrolyze rapidly, causing substantial quantities of monomer to be lost during purification. It has also been found that some commercial monomers initially treated by this procedure to give materials of suitably low acidity later increase in acidity during hydrolysis, causing gelation.

A particularly preferred method of purification which avoids these difficulties is distillation from a metal hydride that is preferably lithium aluminum hydride. The hydride destroys all active hydrogen species present, thus reducing acidity, and reduces esters such as those described above, preventing subsequent increase in acidity during hydrolysis.

It will be apparent that the actual nature of the various acidic species in commercial methyltrialkoxysilanes and their reaction mixtures cannot always be specified. For convenience, acidity is expressed herein, unless otherwise specifically stated, as parts by weight of HCl per million parts by weight of methyltrialkoxysilane, plus water, or, as abbreviated, "p.p.m. hydrochloric acid" or "p.p.m. HCl." However, it is to be understood that this language is not intended to imply that HCl is the only or even one of the acidic species present. Acid content of the monomer alone, when determined, was measured as follows:

To 25 ml. of toluene was added 13 drops of a 0.04% methanol solution of bromcresol purple, and the resultant mixture was titrated to a blue-violet endpoint with 0.02 N potassium hydroxide. A 10.0-ml. sample of methyltrialkoxysilane was pipetted into the solution thus obtained, and the resultant mixture was titrated to the same blue-violet endpoint with 0.02 N potassium hydroxide; a similar 10.0-ml. sample of methyltrialkoxysilane was rapidly weighed. Under these conditions, acidity of the monomer alone is calculated as A–729V/S, where A is acid content in parts by weight (grams) of HCl per million parts by weight (grams) of methyltrialkoxysilane (assuming entire sample is the silane), V is volume of alkali used in second titration described, and S is weight of sample in grams.

Initial hydrolysis-condensation is conveniently carried out by placing in a flask pure water, methyltrialkoxysilane, whose acid content has been suitably adjusted by one of the means just described, and optionally up to 5 mole percent, based on the total hydrolyzable silanes, of one or more compounds of the formula $T_3SiOR$, also purified, if necessary, and heating the resultant mixture under reflux. The initially cloudy reaction mixture clears on heating, usually within an hour, because alcohol formed as a hydrolysis by-product dissolves the other components of the mixture. A suitable degree of hydrolysis-condensation is usually obtained if reflux is allowed to proceed for about one to four hours after the mixture clears. This step can be carried out at lower temperatures, but the rate is substantially slower.

The upper limit of permissible acid content during this initial hydrolysis-condensation is that beyond which gel formation occurs. The lower limit is determined by the desired reaction time. In general, the minimum reaction time to obtain satisfactory products is about one hour of reflux. Maximum and minimum allowable acid contents vary with the ratio of methyltrialkoxysilane and water used. The lower theoretical water content is $Y/2$, where Y is the average number of alkoxy groups attached to silicon throughout the mixture. Thus, when methyltrialkoxysilane is the sole silane constituent, the theoretical lower molar ratio of silane:water is 1:1.5. When the molar silane:water ratio is 1:1.5 the minimum allowable acid content is about 50 parts of HCl per million parts of total methyltrialkoxysilane and water, and the maximum is about 650-700 parts on this same basis. When the molar silane:water ratio is 1:3.0, the minimum allowable acid content ranges from a small positive amount which may be a very slight trace less than 1 p.p.m. HCl, e.g., 0.1-0.01 p.p.m. HCl; or it may be from 1 part up to about 5 parts p.p.m. HCl or a little higher such as 10 parts.

These limits have been carefully established but are necessarily subject to minor variation in each case, for several reasons. First, polymer formation by its nature will not proceed identically in any two runs and the particular mode of polymerization can alter slightly the acid sensitivity of the system. Second, use of other alkoxy silanes as comonomers in amounts previously specified can reduce acid sensitivity, since methyltrialkoxysilanes are most acid labile, but the effect will generally be small. Third, extremely small quantities of impurities in a given sample, impractical to remove, can alter acid sensitivity slightly. These factors, however, affect only the maximal and minimal extremes of allowable acid content, and the major portion of the suitable area indicated will be unchanged.

It is usually most convenient to reduce the acid content of the monomers to about zero weight part per million HCl by one of the methods previously described and, if necessary or desirable (as it usually is), then adjust the acidity of the initial reaction mixture by adding acid to the water used in the calculated amount required to impart the desired acidity to the starting mixture. Although generally, any acidic material soluble in the reaction mixture can be used, organic acids such as phenol and formic acid may sometimes be advantageous because they retard subsequent oxidation of the reactants.

Another preferred solid heat-softenable organopolysiloxane is produced from a mixture of compounds as represented by Formulae III and IV:

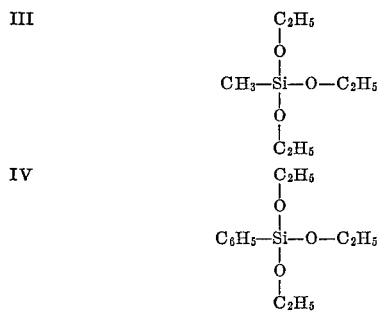

wherein $C_6$ and $H_5$ is phenyl.

During the in situ hydrolysis and polymerization, Compounds III and IV link together by conjoint hydrolysis and condensation to form a copolymer. The molar ratio of the compound as represented by Formula III to the compound as represented by Formula IV can be from 1:0 to 10:1, with a more preferred ratio being about 1:5 to 5:1. A most preferred composition is produced by the hydrolysis and condensation of about 2 moles of the compound as represented by Formula III with about one mole of the compound as represented by Formula IV.

To avoid premature gelation of the resins, the quantity of acid in the reaction mixture must be below about 0.01 mole of acid per mole of hydrolyzable silanol precursor. Thus, it may be of the same order of magnitude as hereinbefore described with reference to the production of organopolysiloxanes from silanes of the kind embraced by Formulae I and II. Similarly, a solvent, e.g., ethanol, can be added to render the reaction mixture homogeneous.

The preferred water concentration for consideration in the production of copolymers made from monomers represented by Formulae III and IV above is about 1.5 to about 3 moles with a most preferred concentration being about 3 moles for every mole total of silane monomer (R—O—) present in the reaction mixture.

A further variation in the procedure can be achieved by hydrolyzing individually a hydrolyzable methyltrialkoxysilane and a hydrolyzable phenyltrialkoxysilane, and then combining the resultant organopolysiloxanes to form the initial reaction mixture described above. It is believed that the product formed in this way is a block copolymer of the constituent organopolysiloxanes.

The subject monomeric organosilane compounds that are represented by Formulae I, II, III and IV can be converted into solid thermosetting organopolysiloxane compounds from liquid concentrated partial condensation products without forming the solid, solvent-soluble heat-softenable siloxane partial condensation products of the present invention by the following general procedure. The organosilane compound or compounds are hydrolyzed and partially condensed at a temperature of from about 50° to about 80° C. for a period of time of from 1 to about 10 hours, in the presence of at least a trace of acid and at least about 1.5 moles of water per mole of silane. This hydrolysis of compounds as represented by Formulae I to IV above is carried out in the presence of water as discussed above. The reaction conditions are then changed from a reflux to distillation and the temperature is maintained constant for a period of time of from about 1 to about 30 minutes to effect the removal of the by-product alcohol and excess water and thereby concentrate the solution of the partial condensation product of the above described reaction. The concentration step effects the further condensation of the liquid organopolysiloxane partial condensation product. The concentrated organopolysiloxane product is then precured (advanced in cure without gelation) at a temperature of from about 90 to about 250° C. for a period of time of from about ½ to about 24 hours to provide a liquid siloxane partial condensation product that is capable of being further cured to a thermoset polymer. This precured product is then cured at a temperature of from about 90 to about 200° C. for a period of time of from about 4 to about 168 hours.

The composition and preparation of the monomeric organosilane compounds and their subsequent polymerization and copolymerization, whereby there is obtained a concentrated, precured siloxane partial condensation product, is described in copending U.S. patent application, Ser. No. 306,344, filed Sept. 3, 1963, now abandoned, U.S. patent application, Ser. No. 370,684, filed May 27, 1964, now abandoned, and U.S. patent application, Ser. No. 520,893, filed Jan. 17, 1966, these applications having an assignee that is common with the assignee of this application.

The formulation and polymerization of the monomeric organosilane compounds and organopolysiloxane compounds of this invention can be carried out in the presence of a solvent such as methanol, ethanol, butanol, acetone, ethyl acetate, benzene, xylene, toluene, ethylene glycol monomethyl ether, ethylene glycol monomethyl ether acetate, ethylene glycol ethyl ether, ethylene glycol ethyl ether acetate, ethylene glycol ethyl butyl ether, ethylene glycol butyl ether acetate, ethylene glycol dibutyl ether, ethylene glycol monohexyl ether, ethylene glycol monophenyl ether, etc.

The invention at hand entails the alteration of either (a) the above-described precuring step, or (b) the further-curing step that immediately follows in order to produce a solid heat-softenable, solvent-soluble partially condensed (potentially thermosetting) product that upon further curing is converted to a thermoset resin. In both embodiments of this invention the hydrolysis and condensation reactions are in accordance with the description given above.

More specifically, by one embodiment of this invention, if the precuring step is carried out at a temperature of from about 10–20° C. below the gel point of the resin, which is at a temperature usually from about 140° to about 220° C., on cooling to room temperature, a solid, heat-softenable, solvent-soluble resin results. The reaction is carried out for a period of time of from about 1 minute to about 1 hour. It is to be noted that these conditions are dependent on the composition of the specific organosilane utilized, and the concentration of water in the reaction mixture. The gel point of this mixture is defined as the temperature at which the reflux product is no longer fluid. After effecting the precure at a temperature which is somewhat below the gel point, upon cooling to room temperature, a solid thermoplastic heat-softenable solvent-soluble resin having excellent optical properties is produced. Likewise, the product resin is flexible and can be formed by techniques such as compression molding and extrusion.

With specific regard to the organosilane compounds as represented by Formulae II, III and IV above, the preferred process in accordance with this invention comprises the steps of: (1) hydrolyzing and condensing the reaction mixture at a temperature of 80° C. for from about 2 to about 6 hours; (2) concentrating the product of step (1) by distilling at 80° C. until about 80 percent of the theoretical yield of ethanol is removed; (3) precuring the product of step (2) by slowly heating to a temperature which is 10° to 20° C. below the gel point of the resin and holding this temperaturer momentarily; and (4) solidifying the product of the precure stage by cooling to room temperature to produce a solid heat-softenable solvent-soluble organopolysiloxane resin.

Alternately, by another embodiment of this invention, the distilling and precure steps as described above remain the same; however, the cure step is interrupted before the thermosetting resin is produced to form a solid heat-softenable, solvent-soluble resin. This cure step is allowed to proceed at a temperature of from about 80° to about 135° C. for a period of time from about 1 to about 300 hours before interruption. It is to be noted that these conditions are dependent on the composition of the specific organosilane utilized, and the concentration of water in the reaction mixture. The criteria used to determine the proper amount of time to allow the cure step to proceed is ascertained by noting when the resin is no longer fluid but instead has a putty-like consistency. Upon cooling to room temperature, a solid, easily powdered, heat-softenable, solvent-soluble polysiloxane resin is produced.

With specific regard to the organosilane compounds as represented by Formulae II, III and IV above, the preferred process in accordance with this embodiment of the subject invention comprises the steps of: (1) hydrolyzing and condensing the reaction mixture at a temperature of 80° C. for from about 2 to about 6 hours; (2) concentrating the product of step (1) by distilling at 80° C. until 80 percent of the theoretical yield of ethanol is removed; (3) precuring the product of step (2) by slowly heating to a temperature which is 30° to 50° C. below the gel point of the resin and holding this temperature for a period of time of from about 1 to about 120 seconds; (4) curing the still liquid product of the precure stage by heating to a temperature of from about 85° to about 99° C. for a period of time of from about 2 to about 10 hours and; (5) solidifying the product of the cure stage by cooling to room temperature to produce a solid heat-softenable solvent-soluble organopolysiloxane resin.

Generally, it may be said that the time it takes to produce a heat-softenable, solvent-soluble resin and the physical properties of said resin depend on the amount of water utilized, the precure and cure temperatures and the organic group or groups which are attached to the silicon component of the monomer.

The heat-softenable, solvent-soluble organopolysiloxane products of the above described process can be easily pulverized to dry, free-flowing powders by conventional techniques. These powders can be compression molded at moderate temperatures and pressures into desirable finished products.

In contrast with the thermoset organopolysiloxane resins of the prior art, the heat-softenable, solvent-soluble resins of this invention are soluble in a wide variety of solvents such as ethanol, methanol, acetone, methylene chloride, benzene, etc.

It is to be noted that a preferred embodiment of this invention utilizes trifunctional organosiloxane compounds. The term "trifunctional" is used herein to describe compounds which have three points at which hydrolysis can occur and hence three points at which polymerization can take place.

Additives believed to be chemically inert under the reaction conditions can be added to the heat-softenable, solvent-soluble organopolysiloxane powder to obtain desired variations in properties. Fillers such as silica, alumina, unreactive organosilanes, amine-clay derivatives, various clays, and asbestos are suitable. Coloring agents, that is, alcohol- or water-soluble dyes or insoluble pigments, can be added to the reaction mixtures of the present invention at any time prior to the end of the precure step. The products thus obtained are useful as colored light filters.

For purposes of this invention, the term "heat-softenable, solvent-soluble" is utilized to describe a solid material which has definite heat-softenable solvent-soluble, properties prior to final cure. The heat-softenable, solvent-soluble properties are useful during the formation of articles for domestic and industrial use, such as filters, coatings, rods, etc. However, it is to be noted that after the desired article is shaped and the final cure is effected, the subject heat-softenable, solvent-soluble organopolysiloxane resins convert to thermoset resins.

The following examples will illustrate the preparation of thermoplastic organopolysiloxane resins by means of the subject invention. These are given for purposes of illustration and not for the purpose of limitation. All parts and percentages are by weight unless otherwise stated.

Example I

A reaction mixture for hydrolysis and condensation was prepared which consisted of 178 g. (1 mole) of methyltriethoxysilane and 45 g. (2.5 moles) of water, and 3 p.p.m. hydrochloric acid as based on the total weight of the reactants. Both the methyltriethoxysilane and the water were purified by distillation to zero p.p.m. hydrochloric acid prior to addition. The reaction mixture was heated with agitation in a flask equipped with a condenser until a temperature of 80° C. was reached. This temperature was maintained for four hours. After the first 15 minutes, the reaction mixture cleared to a one-phase system due to the ethanol liberated in the reaction acting as a mutual solvent. At the end of the four-hour reflux period, approximately 111 g. of an ethanol-water azeotrope was removed by distillation. A viscous liquid resulted from this hydrolysis and condensation, and concentration thereafter, reaction sequence.

The viscous liquid as produced in accordance with the above-described description was then transferred to a beaker and precured by heating with stirring to 140° C. momentarily. This temperature of 140° C. was slightly below the gel point of the resin mixture which was predetermined to be 160° C.

During the preceding step there was a large increase in viscosity, producing an extremely viscous liquid precured resin. When this extremely viscous liquid precured resin was cooled to room temperature, a brittle heat-softenable, solvent-soluble solid organopolysiloxane was obtained. This material was then powdered.

Example II

In this example the heat-softenable solvent-soluble organopolysiloxane was produced by precuring and interrupting the curing sequence of the hydrolysis and condensation product as produced in accordance with the description given in Example I.

The viscous liquid as produced in Example I was transferred to a beaker, and heated with stirring to 120° C. momentarily to effect the precuring of said viscous liquid. The reaction mixture was then poured into an aluminum weighing dish. The aluminum weighing dish containing the precured resin was placed in an oven where the temperature was maintained at about 95° C. At the end of 1 hour, a partially cured resin was removed and cooled to room temperature. A brittle, heat-softenable solvent-soluble organopolysiloxane resin resulted. This material was then powdered.

Example III

Using the reaction mixture and precure sequence as described in Example II, a liquid precured product was obtained. This precured product was then placed in an oven at 95° C. for two hours. At the end of two hours, a distinct thermosetting resin which was not heat-softenable or solvent-soluble was produced, which is to be contrasted with the heat-softenable solvent-soluble organopolysiloxane resin of Example II.

Example IV

A reaction mixture for hydrolysis and condensation was prepared which contained 192 g. (1 mole) of ethyltriethoxysilane plus 54 g. (3 moles) water, and 10 p.p.m. of hydrochloric acid as based on the total weight of the reactants. Both the ethyltriethoxysilane and the water had been purified by distillation to zero p.p.m. hydrochloric acid prior to addition. The reaction mixture was heated with agitation in a flask equipped with a condenser until the pot temperature reached 80° C. This temperature was maintained for 4 hours. After about 30 minutes, the two-phase reaction mixture cleared to a one-phase system due to the ethanol liberated in the reaction acting as a mutual solvent. The reactants were allowed to reflux for 4 hours, during which time approximately 111 g. of an ethanol-water azeotrope was removed by distillation. A viscous liquid resulted from this hydrolysis, condensation, and concentrating procedure.

The viscous liquid produced as above-described was transferred to a beaker and heated with stirring to 180° C. and held at this temperature momentarily. This temperature was slightly below the gel point, which had been predetermined to be 200° C. During this precure sequence, there was a large increase in the viscosity of the reaction mixture. When this syrup was cooled to room temperature, a brittle, heat-softenable, solvent-soluble organopolysiloxane resin was obtained.

Example V

A liquid hydrolysis and condensation product was produced in accordance with the description in Example IV. This was in turn converted to a solid, heat-softenable solvent-soluble organopolysiloxane by interrupting the curing sequence. In this example the viscous liquid which was the result of the hydrolysis and condensation reaction, followed by concentrating the reaction mass, was precured by heating and stirring to 160° C. and held at this temperature momentarily. The precured product was then poured into an aluminum weighing dish and placed in an oven where the temperature was maintained at 95° C. At the end of 12 hours, the partially cured product was removed and cooled to room temperature. A heat-softenable solvent-soluble organopolysiloxane resulted.

Example VI

The precured product as produced in accordance with the description given in Example V was cured at a temperature of 95° C. for 24 hours. At the end of this period, a resin was produced which had distinct thermosetting properties as contrasted with the heat-softenable, solvent-soluble properties of the resin of Example V.

Example VII

A reaction mixture for hydrolysis and condensation was prepared which consisted of 357 g. (2 moles) of methyltriethoxysilane, 240 g. (1 mole) of phenyltriethoxysilane, 162 g. (9 moles) of water, and 3 p.p.m. of hydrochloric acid as based on the total weight of the reactants. In all cases the reactants had been purified by distillation to zero p.p.m. of HCl. The reaction mixture was heated with agitation in a flask equipped with a condenser until the pot temperature reached 80° C. This temperature was maintained for four hours. After about 20 minutes, the two-phase reaction mixture clarified to a one-phase system due to the ethanol liberated in the reaction acting as a mutual solvent. At the end of the four-hour period, approximately 332 g. of an ethanol-water azeotrope was removed by distillation. The hydrolysis and condensation reaction and concentration thereafter produced a viscous liquid.

The viscous liquid was then transferred to a beaker and heated with stirring to 170° C. and held at this temperature momentarily. This temperature was slightly below the gel point which had been predetermined to be 190° C. During this reaction procedure, there was a large increase in viscosity. When the mixture was cooled to room temperature, a heat-softenable, solvent-soluble organopolysiloxane resin was obtained.

Example VIII

The concentrated hydrolysis and condensation product produced in accordance with Example VII was transferred to a beaker and heated with stirring to 140° C. and held at this temperature momentarily to effect its precure. This precured product was then poured into an aluminum weighing dish and placed in an oven where the temperature was maintained at 95° C. At the end of 5 hours a viscous, still liquid material was removed and cooled to room temperature. A heat-softenable solvent-soluble, brittle organopolysiloxane resin resulted.

Example IX

Using the liquid precured product as produced in accordance with the description given in Example VIII, curing was effected at 95° C. for more than 10 hours. At the end of this time, a resin having distinct thermosetting properties was produced as compared with the heat-softenable, solvent-soluble organopolysiloxane resin obtained in Example VIII.

What is claimed is:

1. A process for the production of a solid heat-softenable solvent-soluble organopolysiloxane resin which consists essentially in the steps of:
    (I) heating a mixture consisting essentially of
        (A) ethyltrialkoxysilane in which the alkoxy group contains from 1 to 6 carbon atoms; and
        (B) at least a trace of acid and at least about 1.5 moles of water for every mole of total silane present, at a temperature of from about 50° to about 80° C. for a period of time of from about 1 to about 10 hours;
    (II) concentrating the liquid siloxane partial condensation product from step I by raising its temperature over its initial temperature to a maximum temperature and over a period of time that is sufficient to effect removal of some but not all volatile material including alkanol by-product and some water and to obtain a liquid residue;
    (III) precuring the product of step II by heating it at a temperature of from about 10° to about 20° C. below the gel point of the resin for a period of time of from about 1 second to about 60 minutes in order to advance the condensation reaction further, and said time period being of such duration as will yield, upon cooling to ambient temperature, a solid heat-softenable solvent-soluble organopolysiloxane that is capable of being further cured to a thermoset resin; and (IV) cooling the product of step III to obtain the solid organopolysiloxane recited therein.

2. The process of claim 1, wherein three moles of water are used per mole of ethyltrialkoxysilane.

3. The process of claim 2, wherein about 10 parts per million HCl are used based on the total weight of water and silane.

4. The process as defined in claim 3 in which the heating of step I is at about 80° C. for about 4 hours.

5. The organopolysiloxane resin as produced by the process of claim 1.

6. A process for the production of a solid heat-softenable solvent-soluble organopolysiloxane resin which consists essentially in the steps of:
(I) heating a mixture consisting essentially of
(A) ethyltrialkoxysilane in which the alkoxy group contains from 1 to 6 carbon atoms; and
(B) at least a trace of acid and at least about 1.5 moles of water for every mole of silane present, at a temperature of from about 50° to about 80° C. for a period of time of from about 1 to about 10 hours;
(II) concentrating the liquid siloxane partial condensation product from step I by distilling at the reaction temperature for a period of time sufficient to remove some but not all volatile material including alkanol by-product and some water and to obtain a liquid residue;
(III) precuring the product of step II by heating it at a temperature of from about 90° to about 250° C. for a period of time of from about 1 second to about 2 minutes, followed by further advancement of the cure, after temperature reduction if necessary, by heating at a temperature of from about 90° to about 200° C. for a period of time of from about 1 to about 300 hours, said temperature and time being correlated so as to obtain, upon cooling to ambient temperature, a solid heat-softenable solvent-soluble organopolysiloxane that is capable of being still further cured to a thermoset resin; and
(IV) cooling the product of step III to obtain the solid organopolysiloxane recited therein.

7. A process for the production of a solid heat-softenable, solvent-soluble organopolysiloxane resin which consists essentially in the steps of:
(I) heating a mixture consisting essentially of
(A) ethyltriethoxysilane; and
(B) from about 1.5 to about 3 moles of water for every mole of silane, there being less than 0.01 mole of acid present in the reaction mixture per mole of said silane introduced thereto at a temperature of about 80° C. for a period of time of from about 2 to about 6 hours;
(II) concentrating the liquid siloxane partial condensation product from step I by raising its temperature over its initial temperature to a maximum temperature and over a period of time sufficient to effect removal of approximately 80 percent of the theoretical yield of ethanol to obtain a liquid residue;
(III) precuring the product of step II by heating it slowly to a temperature of from about 10° to about 20° C. below the gel point of the resin and holding this temperature momentarily in order to advance the condensation reaction further, and said time period being of such duration as will yield, upon cooling to ambient temperature, a solid heat-softenable solvent-soluble organopolysiloxane that is capable of being further cured to a thermoset resin; and (IV) cooling the product of step III to obtain the solid organopolysiloxane recited therein.

8. A process for the production of a solid heat-softenable solvent-soluble organopolysiloxane resin which consists essentially in the steps of:
(I) heating a mixture consisting essentially of
(A) ethyltriethoxysilane; and
(B) from about 1.5 to about 3 moles of water for every mole of silane, there being less than 0.01 mole of acid present in the reaction mixture per mole of said silane introduced thereto, at a temperature of about 80° C. for a period of time of from about 2 to about 6 hours;
(II) concentrating the liquid siloxane partial condensation product from step I by distilling at the reaction temperature for a period of time sufficient to remove approximately 80 percent of the theoretical yield of ethanol and some water and to obtain a liquid residue;
(III) precuring the product of step II by heating it slowly to a temperature of from about 30° to about 50° C. below the gel point of the resin and holding this temperature for a period of time of from about 1 to about 120 seconds, followed by further advancement of the cure, after temperature reduction if necessary, by heating at a temperature from about 85° to about 99° C. for a period of time of from about 2 to about 10 hours, said temperature and time being correlated so as to obtain, upon cooling to ambient temperature, a solid heat-softenable solvent-soluble organopolysiloxane that is capable of being still further cured to a thermoset resin; and
(IV) cooling the product of step III to obtain the solid organopolysiloxane recited therein.

9. A process for the production of a solid heat-softenable solvent-soluble organopolysiloxane resin which consists essentially in the steps of:
(I) heating a mixture consisting essentially of
(A) ethyltriethoxysilane; and
(B) from 1.5 to about 10 moles of water per mole of ethyltriethoxysilane, said mixture containing by weight from 0 to 700 parts of acid, expressed as HCl, per million parts of total silane reactant material, said maximum of 700 parts of acid being the approximate upper limit when using a silane:water mole ratio of 1:1.5 and decreasing to a maximum of 1 weight part of acid, expressed as HCl, per mole of total silane reactant material when the silane:water mole ratio employed is 1:10, at a temperature of about 80° C. for a period of time of from about 2 to about 6 hours;
(II) concentrating the liquid siloxane partial condensation product from step I by distilling at the reaction temperature for a period of time sufficient to remove some but not all volatile material including alkanol by-product and some water and to obtain a liquid residue;
(III) precuring the product of step II by slowly heating it to a temperature of from about 10° to about 20° C. below the gel point of the resin and holding this temperature momentarily in order to advance the condensation reaction further, and said time period being of such duration as will yield, upon cooling to ambient temperature, a solid heat-softenable solvent-soluble organopolysiloxane that is capable of being further cured to a thermoset resin; and
(IV) cooling the product of step III to obtain the solid organopolysiloxane recited therein.

10. A process for the production of a solid heat-softenable solvent-soluble organopolysiloxane resin which consists essentially in the steps of:
(I) heating a mixture consisting essentially of
(A) ethyltriethoxysilane; and (B) from 1.5 to about 10 moles of water per mole of total silane reaction material, said mixture containing by weight from 0 to 700 parts of acid, expressed as HCl, per million parts of total silane reaction material, said maximum of 700 parts of acid being the approximate upper limit when using a silane:water mole ratio of 1:1.5 and decreasing to a maximum of 1 weight part of acid, expressed as HCl, per mole of total silane reaction material when the silane:water mole ratio employed is 1:10; at a temperature of about 80° C. for a period of time of from about 2 to about 6 hours;

(II) concentrating the liquid siloxane partial condensation product from step I by distilling at the reaction temperature for a period of time sufficient to remove approximately 80 percent of the theoretical yield of ethanol and some water and to obtain a liquid residue;

(III) precuring the product of step II by heating it at a temperature of from about 30° to about 50° C. below the gel point of the resin for a period of time of from about 1 to about 120 seconds, followed by further advancement of the cure, after temperature reduction if necessary, by heating at a temperature of from about 85° to about 99° C. for a period of time of from about 1 to about 10 hours, said temperature and time being correlated so as to obtain, upon cooling to ambient temperature, a solid heat-softenable solvent-soluble organopolysiloxane that is capable of being still further cured to a thermoset resin; and (IV) cooling the product of step III to obtain the solid organopolysiloxane recited therein.

References Cited

UNITED STATES PATENTS

| | | | |
|---|---|---|---|
| 3,245,918 | 4/1966 | Burzynski | 23—182 |
| 3,257,330 | 6/1966 | Burzynski et al. | 260—46.5 |
| 3,354,095 | 11/1967 | Burzynski et al. | 252—451 |

FOREIGN PATENTS

| | | | |
|---|---|---|---|
| 1,082,116 | 9/1967 | Great Britain | |

DONALD E. CZAJA, *Primary Examiner.*

M. I. MARQUIS, *Assistant Examiner.*